(12) United States Patent
Eichwald

(10) Patent No.: US 9,690,426 B1
(45) Date of Patent: Jun. 27, 2017

(54) HEURISTIC TOUCH INTERFACE SYSTEM AND METHOD

(71) Applicant: Rockwell Collins, Inc., Cedar Rapids, IA (US)

(72) Inventor: Paul L. Eichwald, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 3 days.

(21) Appl. No.: 14/809,820

(22) Filed: Jul. 27, 2015

(51) Int. Cl.
*G06F 3/041* (2006.01)
*G06F 3/0488* (2013.01)

(52) U.S. Cl.
CPC .......... *G06F 3/0418* (2013.01); *G06F 3/0488* (2013.01); *G06F 2203/04104* (2013.01); *G06F 2203/04106* (2013.01)

(58) Field of Classification Search
CPC ................. G06F 3/0418; G06F 3/0488; G06F 2203/04104; G06F 2203/04106
See application file for complete search history.

(56) References Cited

U.S. PATENT DOCUMENTS

| | | | | |
|---|---|---|---|---|
| 4,760,530 A | * | 7/1988 | Liden | G05D 1/0005 700/36 |
| 2011/0181523 A1 | * | 7/2011 | Grothe et al. | G06F 3/0418 345/173 |
| 2011/0187651 A1 | * | 8/2011 | Whitlow et al. | G06F 3/041 345/173 |
| 2012/0078570 A1 | * | 3/2012 | Rothkopf et al. | G01C 19/58 702/141 |
| 2013/0194193 A1 | * | 8/2013 | Kawalkar | G06F 3/041 345/173 |

* cited by examiner

*Primary Examiner* — Liliana Cerullo
(74) *Attorney, Agent, or Firm* — Angel N. Gerdzhikov; Donna P. Suchy; Daniel M. Barbieri

(57) ABSTRACT

A heuristic touch interface system includes a touch interface device having a touch input surface and being configured to provide touch input data indicative of a location of a touch input from a user on the touch input surface. An accelerometer determines acceleration forces relative to the touch input surface and provides acceleration data. A heuristic controller accesses the acceleration data to determine if an acceleration force exceeds a predetermined threshold. In response to an acceleration force exceeding the predetermined threshold, the heuristic controller accesses the touch input data, generates acceleration-corrected touch input data, and transmits a signal indicative of the acceleration corrected touch data to an avionics system.

16 Claims, 4 Drawing Sheets

HEURISTIC TOUCH INTERFACE SYSTEM AND METHOD

BACKGROUND

Touchscreens and other touch interfaces allowing users to provide touch inputs have become widely implemented in avionics. For example, single-touch touchscreen interfaces have been successfully implemented in multiple avionic systems and aircraft platforms. Single-touch touchscreen interfaces recognize relatively simple inputs from single-touch gestures such as clicking a button or key, moving a cursor to the location of the touch, switching between windows, or other relative simple single-touch inputs and gestures. More complex single-touch interfaces allow users to long-press, scroll, drag-and-drop. Recent advances in touchscreen technology introduced multi-touch interfaces to avionics. Multi-touch touch interfaces recognize the presence of two, three, or more points on the contact surface of the touch and allow for relatively complex user inputs such as pinch-and-zoom, rotate, tilt, pan, drag-and drop, or other complex multi-touch inputs.

A problem unique to avionics implementations of touch interfaces is caused by the fact that both the touch interface and the user may be subjected to significant acceleration forces in all three axes (e.g., X, Y, and Z) during normal avionics operations. For example, turbulence, rapid maneuvering, landings, takeoffs, sharp turns, evasive maneuvers, or other acceleration events exert large, quickly changing, and sometimes sudden acceleration forces on the user and the touch interface during user input to the touch interface. These acceleration forces can cause inputs to be misinterpreted by the avionics systems, or may cause correct inputs to not be received by avionics systems for both single-touch and multi-touch touch gestures. For example, a user may move a finger laterally or randomly while providing input without intending to do so due to acceleration forces. A simple single-touch input may inadvertently be interpreted by the touch interface as a slide due to X, Y, or Z movement of the aircraft platform. In some cases, a single-touch or multi-touch gesture may be inadvertently done as a result of any combination of XY, YZ, or XZ acceleration forces on the user of touch interface during the initial touch of the touch interface. Further, a drag input may be disrupted, or a single click may be inadvertently applied as a double or triple click in some cases.

It would be advantageous to provide a touch interface system and method to distinguish between a purposeful single-touch or multi-touch input and an input that is inadvertent or that has been altered due to acceleration forces so as to minimize touch interface errors.

SUMMARY

In one aspect, embodiments of the inventive concepts disclosed herein are directed to a heuristic touch interface system. The system includes a touch interface device having a touch input surface. The touch interface device is configured to provide touch input data indicative of a location of a touch input from a user on the touch input surface. The system also includes an accelerometer configured to determine acceleration forces relative to the touch input surface and to provide acceleration data indicative of acceleration forces relative to the touch input surface. A heuristic controller includes a processor communicatively coupled with the accelerometer and the touch interface device. The processor is coupled with a non-transitory processor-readable medium storing processor executable code for causing the processor to access the acceleration data to determine if at least one acceleration force of the acceleration forces relative to the touch input surface exceeds a predetermined threshold. In response to the at least one acceleration force exceeding the predetermined threshold, the processor accesses the touch input data and applies a heuristic algorithm to the touch input data to generate acceleration-corrected touch input data, and transmits at least one signal indicative of the acceleration corrected touch data to an avionics system.

In a further aspect, embodiments of the inventive concepts disclosed herein are directed to a method of controlling a touch interface. The method may include accessing, by a heuristic controller including a processor communicatively coupled with an accelerometer, acceleration data indicative of acceleration forces relative to a touch input surface. The method may also include determining, by the heuristic controller, if at least one acceleration force of the acceleration forces relative to the touch input surface exceeds a predetermined threshold. The method may further include in response to the at least one acceleration force exceeding the predetermined threshold, accessing touch input data indicative of a location of a touch input on the touch input surface and generating acceleration-corrected touch input data by applying a heuristic algorithm to the touch input data. The method may also include transmitting, by the heuristic controller, at least one signal indicative of the acceleration corrected touch data to an avionics system.

BRIEF DESCRIPTION OF THE DRAWINGS

Like reference numerals in the figures may represent and refer to the same or similar element, feature, step, or function. Implementations of the inventive concepts disclosed herein may be better understood when consideration is given to the following detailed description thereof. Such description makes reference to the annexed pictorial illustrations, schematics, graphs, drawings, and appendices, which are not necessarily to scale, and in which some features may be exaggerated and some features may be omitted or may be represented schematically or symbolically in the interest of clarity. In the drawings.

DETAILED DESCRIPTION OF EXEMPLARY EMBODIMENTS

Figure 1:
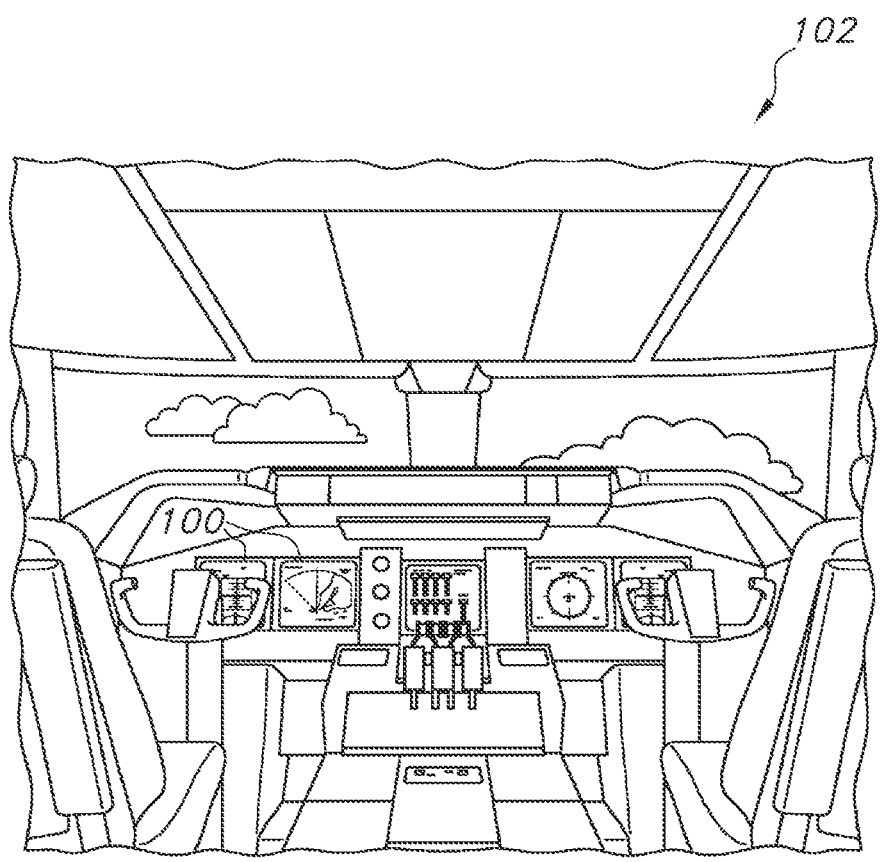
FIG. 1 is a diagram of an exemplary embodiment of a touch interface according to the inventive concepts disclosed herein shown in an aircraft cockpit.

Before explaining at least one embodiment of the inventive concepts disclosed herein in detail, it is to be understood that the inventive concepts are not limited in their application to the details of construction and the arrangement of the components or steps set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements, steps, and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "some embodiments," "one embodiment," or "an embodiment" means that a particular element, feature, structure, step, or characteristic described in connection with the embodiment is included in at least one embodiment. The appearances of the phrase "in some embodiments" in various places in the specification are not necessarily all referring to the same embodiment, and embodiments of the inventive concepts disclosed may include one or more of the features described herein, or any combination of sub-combination of two or more such features, along with any other features which may not necessarily be described or inherently present in the instant disclosure.

Broadly, embodiments of the inventive concepts disclosed herein are directed to heuristic touch interface systems and methods configured to reliably and accurately interpret touch input in environments where acceleration forces are exerted on the user and/or the touch interface system. In some embodiments, heuristic touch interface systems according to the inventive concepts disclosed herein include an accelerometer coupled with a touch input surface of the touch interface and configured to determine acceleration forces in all three axes relative to the touch input surface and/or the touch interface.

A heuristic controller may monitor acceleration data from the accelerometer, and determine whether acceleration in one or more of the three axes exceeds a predetermined threshold. In response to acceleration forces being below the predetermined threshold, the heuristic controller may pass through (e.g., without modifying) touch input data from the touch interface to one or more avionics systems. In response to acceleration forces meeting or exceeding the predetermined threshold, the heuristic controller may process the touch input data from the touch interface. For example, the heuristic controller may determine if the acceleration forces affected the input, filter out the acceleration forces, reject erroneous inputs, correct an input, ignore inputs, provide error messages, request input confirmation or repeat, or combinations thereof. The heuristic controller may then provide an acceleration-corrected touch input to one or more of the avionics systems.

In some embodiments, multiple accelerometers may be implemented, which may allow for cross-checking of two or more accelerometers against one another to enhance the reliability and accuracy of acceleration force measurements in all three axes (e.g., X, Y, and Z, or pitch, yaw, and roll) as described in detail below.

Referring now to FIG. 1, an exemplary embodiment of a heuristic touch interface system 100 according to the inventive concepts disclosed herein is shown implemented in an aircraft cockpit 102. It is to be understood that while a plurality of heuristic touch interface systems 100 are shown implemented as head down touchscreen displays in FIG. 1, in some embodiments the heuristic touch interface system 100 may be implemented as a head down touchscreen display, a stand-alone touchscreen display, a head-up display, an electronic flight bag, a trackpad, a touchpad, or other suitable touch interface system or device configured to receive touch inputs from a user.

Further, while the heuristic touch interface system 100 is shown implemented in an aircraft cockpit 102, embodiments of heuristic touch interface systems according to the inventive concepts may be implemented in a variety of vehicles or platforms where acceleration forces are exerted on users. For example, heuristic touch interface systems according to the inventive concepts disclosed herein may be implemented in boats, terrestrial vehicles, space vehicles, marine vehicles, rotary wing aircraft, fixed-wing aircraft, in aircraft cabins, seatback displays or entertainment systems, portable touch interfaces, or combinations thereof.

Figure 2:
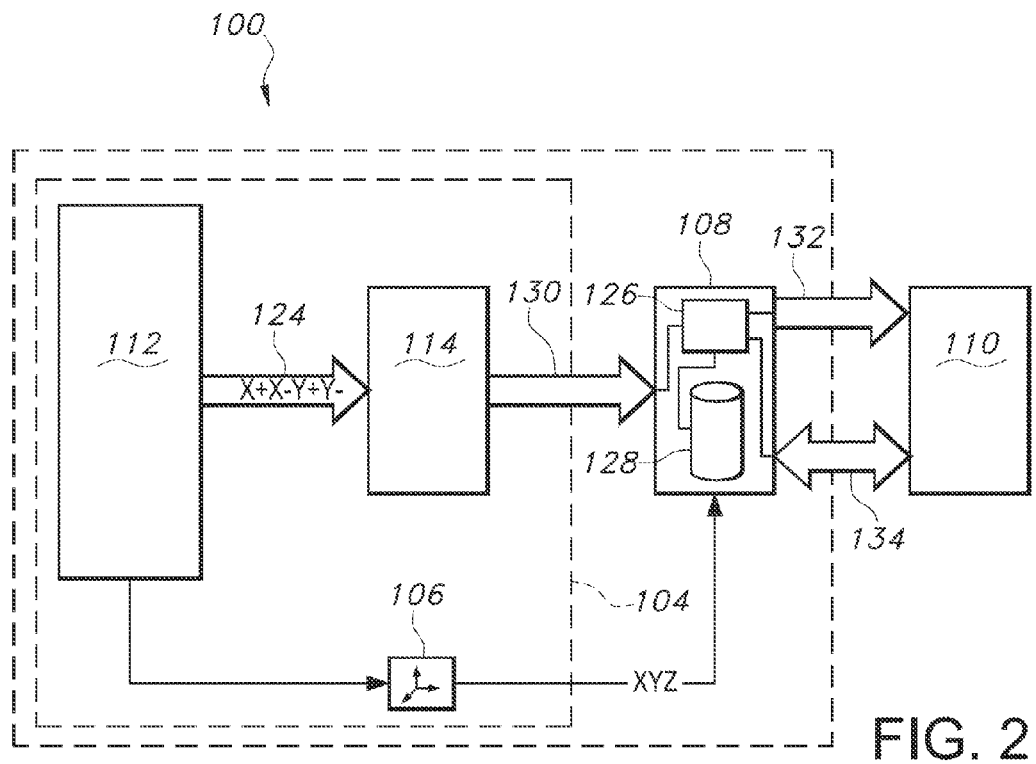
FIG. 2 is a diagram of an exemplary embodiment of a heuristic touch interface system according to the inventive concepts disclosed herein.
Figure 3:
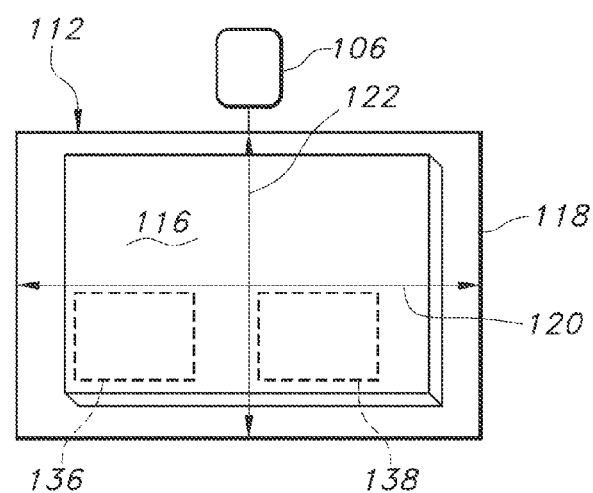
FIG. 3 is a diagram of a touch input surface of the heuristic touch interface system of FIG. 2.

Referring now to FIGS. 2-3, the heuristic touch interface system 100 includes a touch interface device 104, an accelerometer 106, and a heuristic touch interface controller 108 and is shown coupled with an avionics system 110 such that data and/or signals may be interchanged between the heuristic touch interface system 100 and the avionics system 110.

The touch interface device 104 includes a touch interface 112 and a touch interface controller 114. The touch interface 112 may be implemented as a touchscreen, a touchpad, or a virtual keyboard, and may include a touch input surface 116 and a housing 118.

The touch input surface 116 is configured to detect at least one touch input provided by a user, such as single-touch input and/or a multi-touch input. The touch input surface 116 may be implemented as a touchscreen, trackpad, virtual keypad, or combinations thereof. The touch input surface 116 may have two orthogonal axes 120 and 122 such that a two-dimensional grid (e.g., X,Y) or coordinate system may be implemented to identify a relative location of one or more touch inputs (e.g., single-touch and/or multi-touch) on the touch input surface 116. For example, where the two axes 120 and 122 intersect at a center of the touch input surface 116, the intersection point may be arbitrarily designated as a zero, and the coordinate system may be formatted as (X+; X−; Y+; Y−). It is to be understood that while the touch input surface 116 is shown as rectangular, the touch input surface 116 may have any desired shape, size, aspect ratio, and curvature, as will be appreciated by persons of ordinary skill in the art having the benefit of the instant disclosure. Any desirable X,Y, or other two-dimensional coordinate system may be implemented to identify a relative touch input location on the touch input surface 116.

The touch interface controller 114 is coupled with the touch interface 112 via a path 124 (e.g., a bi-directional data bus, a wired connection, or a wireless connection) and may be implemented as at least one processor coupled with a non-transitory processor-readable medium storing data and/or processor executable code configured to enable the touch interface controller 114 to receive data from the touch interface 112 via the path 124. In some embodiments, the touch interface controller 114 may be implemented as one or more of a digital signal processor, a central processing unit, a multi-core processor, a field-programmable gate array (FPGA), an application-specific integrated circuit (ASIC), or combinations thereof. Data indicative of a relative location of a touch input on the touch input surface 116 may be provided as an X,Y coordinate or in any other desired format to the touch interface controller 114. In some embodiments, where the touch interface 112 includes a touchscreen display, the touch interface controller 114 may be configured to provide data indicative of one of more images to be displayed to a user via the touch interface 112 and/or data indicative of one or more user-selectable touch and/or graphical interfaces to be provided to the user on the touch input surface 116 of the touch interface 112.

The housing 118 may be implemented as a bezel or other external housing and may house the touch interface 112, the touch interface controller 114, the accelerometer 106, and/or other components of the heuristic touch interface system 100.

The accelerometer 106 is operatively coupled with the touch interface device 104 and is configured to measure, detect, or otherwise determine acceleration forces in at least two, but preferably three axes relative to the touch input surface 116, which acceleration forces are either directly or indirectly exerted or applied to the touch input surface 116. In some embodiments, the accelerometer 106 may be implemented as a micro electro-mechanical system (MEMS) device, a piezoelectric accelerometer, a piezoresistive accelerometer, a capacitive accelerometer, a 3-axis silicon micromachined accelerometer, a surface-mount accelerometer, or combinations thereof.

As shown in FIG. 3, the accelerometer 106 may be operably coupled with the touch input surface 116 at a known position, point, or location so as to detect acceleration forces relative to the axes 120 (e.g., X axis) and 122 (e.g., Y axis), and preferably along a third axis (or Z axis, not shown) orthogonal to the axes 120 and 122. In some embodiments, the accelerometer 106 may be configured to determine acceleration relative to pitch, yaw, and roll of an aircraft or other moving platform. In some embodiments, the accelerometer 106 may be coupled with a point or edge of the touch input surface 116 such as along one of the axes 120 or 122 and/or may be housed in the housing 118, while in some embodiments the accelerometer 106 may be physically separate from the touch input surface 116 and/or the touch interface device 104 as will be appreciated by persons of ordinary skill in the art having the benefit of the instant disclosure.

Further, while one accelerometer 106 is shown and described herein, the inventive concepts disclosed herein may be implemented with any desired number of accelerometers 106. The accelerometer 106 may be configured to measure, detect, calculate, or otherwise determine a magnitude, size, direction, duration, or any other characteristic of at least one acceleration force applied relative to the touch input surface 116 either directly or indirectly. The accelerometer 106 is further configured to transmit a signal indicative of the at least one acceleration force to the heuristic controller 108 continuously, intermittently, in response to the at least one acceleration force exceeding a predetermined threshold, and combinations thereof.

The heuristic controller 108 is communicatively coupled with the touch interface device 104, the accelerometer 106, and the avionics system 110, and includes a processor 126 coupled with a memory 128.

The processor 126 may be implemented as at least one or one or more of a digital signal processor, a central processing unit, a multi-core processor, a field-programmable gate array (FPGA), an application-specific integrated circuit (ASIC), or combinations thereof. In some embodiments, the processor 126 may include an on-board FLASH memory storing processor-executable code, software, and/or firmware. The processor 126 is coupled with the touch interface device 104 via a bi-directional path 130 (e.g., data bus) so as to allow the processor 126 to exchange data and/or signals with the touch interface controller 114 of the touch interface device 104. The processor 126 may receive touch input data indicative of a relative location (e.g., X,Y) of a touch input on the touch input surface 116 from the touch interface device 104. The processor 126 may further receive acceleration data from the accelerometer 106 indicative of at least one or one or more acceleration forces applied to the touch input surface 116 (e.g., in two dimensions X,Y relative to the axes 120 and 122, or in three-dimensions X,Y,Z) intermittently, continuously, periodically, in real-time, or near real-time.

The memory 128 stores processor-executable instructions (e.g., in the form of software and/or firmware) for causing the processor 126 to carry out the functionality described herein and/or data. The memory 128 may be implemented as at least one non-transitory processor-readable medium, such as a hard drive, a FLASH memory, a USB drive, a solid-state drive, a memory card, a cloud memory, a CD-ROM, or combinations thereof.

It is to be understood, that while the touch interface controller 114 and the heuristic controller 108 are shown as described as separate controllers, in some embodiments, the touch interface controller 114 and the heuristic controller 108 may be merged as a single controller, or one of the touch interface controller 114 and the heuristic controller 108 may be omitted and the other of the touch interface controller 114 and the heuristic controller 108 may carry out the functionality of the omitted controller. For example, an existing touch interface device 104 may be retrofitted with the accelerometer 106 and the heuristic controller 108 as described herein, and a new touch interface device 104 may include the accelerometer 106 and may implement the functionality of the heuristic controller 108 in the touch interface controller 114 as will be appreciated by a person of ordinary skill in the art having the benefit of the instant disclosure.

The avionics system 110 may be a flight management system, an autopilot flight director, an adaptive flight display, a primary flight display, a multi-function display, or any other avionics system configured to receive touch inputs from a user and/or to provide touch input user interface and/or information to a user. The avionics system 110 is coupled with the heuristic controller 108 via a path 132 (e.g., a data bus) configured to carry data from the heuristic controller 108 to the avionics system 110, and a path 134 (e.g., a data bus) configured to carry data and/or signals from the avionics system 110 to the heuristic controller 108. The path 132 is shown as providing touch input data from the heuristic touch interface system 100 to the avionics system 110. The touch input data may include touch input data from the touch input device 104 and/or acceleration-corrected touch input data from the heuristic controller 108 as described below. The path 134 is shown as providing data from the avionics system 110 to the heuristic touch interface system 100. As will be appreciated by a person of ordinary skill in the art, the path 132 and/or the path 134 may be bi-directional in some embodiments, and in some cases the path 132 or the path 134 may be omitted.

The avionics system 110 may provide the heuristic controller 108 with data indicative of at least one low-priority region, area, or zone 136 (FIG. 3) of the touch input surface 116 and at least one high-priority region, area, or zone 138 (FIG. 3) of the touch input surface 116 and/or with data indicative of the touch interface provided on the touch input surface 116. Accordingly, the heuristic controller 108 may apply a first algorithm to touch input data indicative of touch input located in the low-priority region 136, and a second algorithm different from the first algorithm to touch input data indicative of touch input located in the high-priority region 138 of the touch input interface 116.

In some cases, designating X and Y high priority regions 138 (e.g., button or other touch user interface locations) of the touch input surface 116 may allow the heuristic controller 108 to process touch inputs from specific areas of the touch input surface 116 with and acceleration data from the accelerometer 106 with a different algorithm. For example, if the area is the high priority area 138, an incomplete or corrupted touch input provided to the high priority area 138 may be ignored or suppressed by the heuristic controller 108 and/or a message or alert may be displayed to the user prompting the user to re-attempt or confirm the touch input. In the low priority area 136, a different process may be implemented to interpret the intended touch input based on the initial touch input and the acceleration data. Using this information the heuristic controller 108 may calculate the intended touch input and pass the acceleration corrected touch input data to the avionics system 110.

In some embodiments, the processor 126 may execute a heuristic algorithm stored in the memory 128 to determine if the touch input has been corrupted by any high acceleration forces applied to the touch input surface 116 and/or the user providing the touch input. A set of calibration factors may be employed within the heuristic algorithm and used by the processor 126 to determine the X, Y, and Z acceleration values that can cause errors. In some embodiments, the heuristic algorithm may be configured to ignore corrupted touch inputs or to interpret touch inputs and send an interpreted intended touch input based on the initial touch input location on the touch input surface 116 and the magnitudes of the X, Y, or Z acceleration forces applied to the touch surface 116 at the time of the touch input.

In operation, the heuristic touch interface system 100 may function as follows. A user provides a touch input such as a single-touch or multi-touch gesture by interacting with the touch input surface 116 (e.g., during normal flight operations). For example, the user may interact by selecting a button or other graphical user interface or touch user interface feature presented on the high priority region 138 and/or the low priority region 136 of the touch input surface 116. The touch interface device 104 may determine a relative X, Y location on the touch input surface 116 and transmit one or more signals indicative of the touch input to the heuristic controller 108. At the same time as the touch input is being provided by the user, the accelerometer 106 measures, detects, or otherwise determines acceleration forces applied relative to the touch input surface 116, desirably in real-time, and generates acceleration data indicative of at least one acceleration force applied in at least one direction relative to the touch input surface 116. Preferably, the accelerometer 106 provides acceleration data for acceleration forces applied in all three dimensions or X,Y, and Z directions relative to the touch input surface 116.

The heuristic controller 108 accesses or receives the acceleration data from the accelerometer 106 and the touch input data from the touch interface device 104. The heuristic controller 108 determines whether at least one acceleration force from the acceleration data exceeds a predetermined threshold. The predetermined threshold may be based on whether the location of the touch input is within the low priority region 136 or the high priority region 138 of the touch input surface 116, or the threshold may be preset or customizable based on aircraft type, touch interface device 104 type, resolution, or sensitivity, aircraft load, flight stage, mission, flight leg, expected weather or turbulence, or any other user or manufacturer preference or suitable criteria.

It is to be understood that while a predetermined threshold is described herein, in some embodiments the heuristic controller 108 may implement a predetermined range instead of, or in addition to the predetermined threshold. For example, a predetermined range may be used by the heuristic controller 108 to heuristically interpret touch inputs as described below.

In response to the heuristic controller 108 determining that none of the acceleration forces meet or exceed the predetermined threshold, the heuristic controller 108 may simply pass through the touch input data to the avionics system 110. In some embodiments, the heuristic controllers 108 may be bypassed and the touch interface device 104 may provide the touch input data directly to the avionics system 110 when the heuristic controller 108 determines that none of the acceleration forces exceed the predetermined threshold as described above.

In some embodiments where the heuristic controller 108 is retrofitted to an existing system, the heuristic controller 108 may be embedded into the existing system and may serve as a co-processor of the touch interface controller 114 and may communicate with the avionics system 110. This design may allow the heuristic controller 108 to receive data from the avionics system 110 indicative of various screen formats or other touch interface formats provided to the user by the touch input surface 116 of the touch interface device 104. In such cases, priority mapping (e.g., defining at least one priority region 136 and/or at least one high priority region 138) for the touch input surface 116 may be dynamic and may be based on the touch interfaces displayed on the touch input surface 116 at any given time. This configuration may allow for any desired number, size, orientation, and configuration of high and low priority regions 136 and 138 across the touch input surface 116 at different times. In some embodiments, priority map regions including at least one low-priority region 136 and at least one high-priority region 138 may be static and may be assigned to coincide with predetermined buttons that are provided in the defined regions for all touch interface formats on the touch input interface 116. This static allocation may be implemented where the heuristic controller 108 receives no information from the avionics system 110 indicative of the particular touch interface displayed or provided to the user at a given time by the touch input interface 116. Further, in some cases, the touch input interface 116 may include a combination of one or more static low and high priority regions 136 and 138 and one or more dynamic low priority and high priority regions 136 and 138 as will be appreciated by a person of ordinary skill in the art having the benefit of the instant disclosure.

In some retrofit implementations, the heuristic controller 108 may be installed in line with the original touch input device 104 hardware. The heuristic controller 108 may simply pass the touch input data to the avionics system 110 unaltered under normal (e.g., non-turbulent) conditions where acceleration forces are below the predetermined threshold. When acceleration forces (in the X, Y, and/or Z direction) of a specific magnitude coincide with a touch input received by the touch input interface 116, the heuristic controller 108 may compensate by either interpreting what the intended touch input is, or by filtering out the touch input partially or completely.

For example, the heuristic controller 108 may suppress or otherwise prevent the touch input from reaching the avionics system 110 or cancel the touch input at the avionics system 110. In some embodiments, where the touch interface controller 114 is coupled with the avionics system 110, the heuristic controller 108 may transmit a signal, command, or message to the avionics system 110 causing the avionics system 110 to ignore touch input from the touch interface controller 114, or the heuristic controller 108 may send a signal, command, or message to the touch interface controller 114 causing it to suppress or not transmit touch input to the avionics system 110, or combinations thereof.

Figure 4:
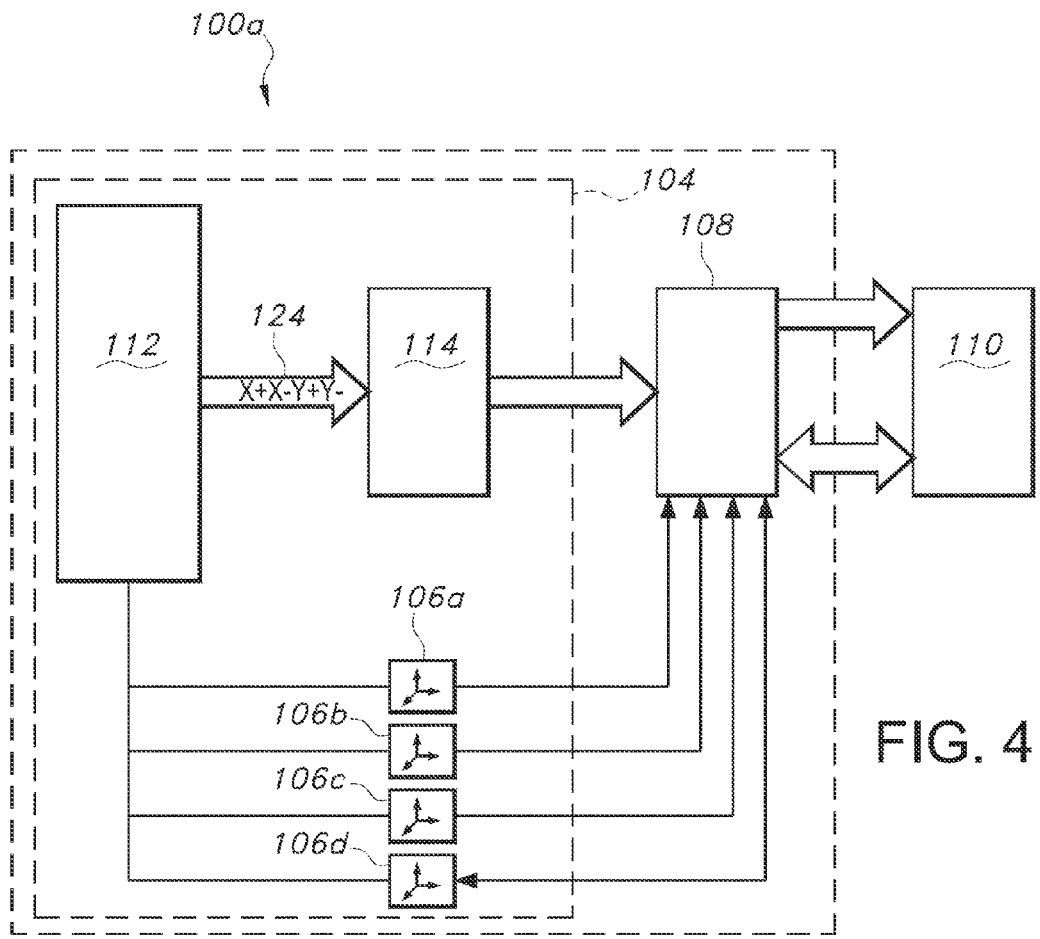
FIG. 4 is a diagram of an exemplary embodiment of a heuristic touch interface system according to the inventive concepts disclosed herein.
Figure 5:
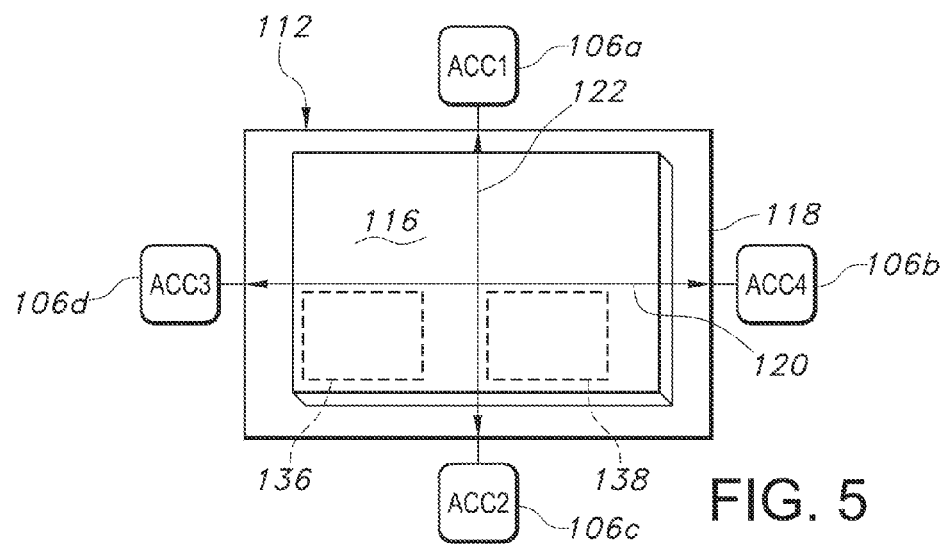
FIG. 5 is a diagram of a touch input surface of the heuristic touch interface system of FIG. 4.

Referring now to FIGS. 4-5, an exemplary embodiment of a heuristic touch interface system 100a according to the inventive concepts disclosed herein is shown coupled with the avionics system 100. The heuristic touch interface system 100a may be implemented and may function similarly to the heuristic touch interface system 100, except that a touch interface device 104a includes four accelerometers 106a, 106b, 106c, and 106d are coupled with the touch input surface 116 in a diametrically opposed manner along the axes 120 and 122 as shown in FIG. 5. It is to be understood that the accelerometers 106a-d may be coupled to different positions relative to the touch input surface 116, and may be separated by known distances from one another in some embodiments. Further, in some embodiments, two or more, or all of the accelerometers 106a-d may be coupled to the same position relative to the touch input surface 116, or may be coupled at positions not located along the axes 120 and 122, or combinations thereof.

Implementing pairs of accelerometers 106a and 106c and 106b and 106d a known distance apart along the X (axis 122) and/or Y (axis 120) of the touch input surface 116 and/or housing 118 provides the heuristic controller 108 with the capability to cross-check acceleration data and improved accuracy of the respective pair of accelerometers 106a and 106c and 106b and 106d.

Figure 6:
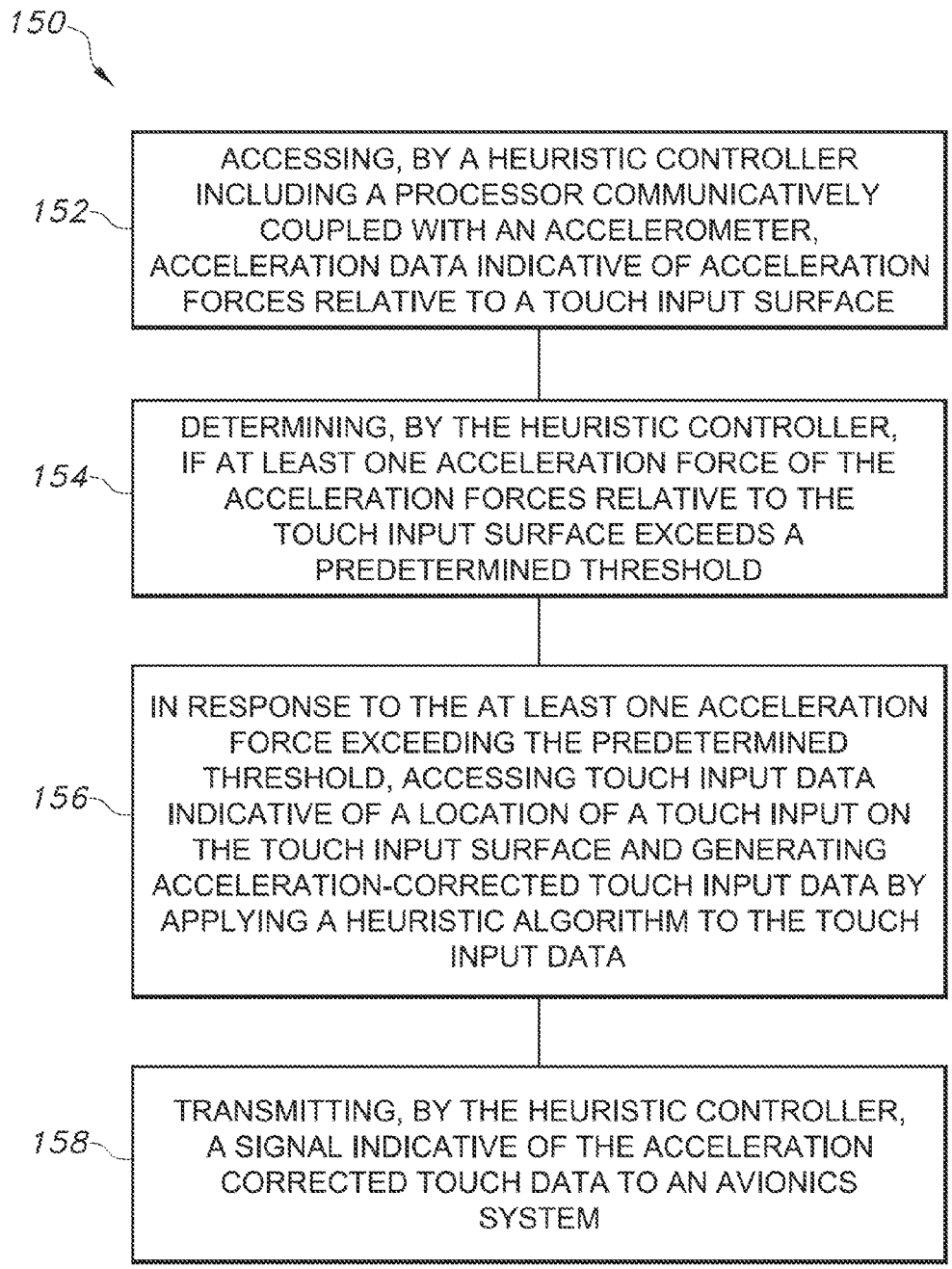
FIG. 6 is a diagram of an exemplary embodiment of a method for controlling a touch interface according to the inventive concepts disclosed herein.

It is to be understood that while four accelerometers 106a-d are shown in FIGS. 5-6, some embodiments of the inventive concepts may be implemented with at least one pair of at least two opposing accelerometers along the X axis (axis 120) only, or with at least two opposing accelerometers along the Y axis (axis 122) only, in some cases.

In operation, the heuristic touch interface system 100a may operate similarly to the heuristic touch interface system 100, with the added redundancy of multiple accelerometers, and with added accuracy from cross-checking acceleration data from at least one pair of opposing accelerometers (e.g., 106a and 106c, and/or 106b and 106d) against one another. The heuristic controller 118 may cross-check the acceleration data to further increase accuracy of the heuristic touch interface system 100a.

Cross-checking acceleration data can include one or more or all of the following: independently confirming acceleration data between two or all of the available accelerometer 106a-d, taking a difference between acceleration data from two accelerometers 106a-d, carrying out statistical analysis of accelerometer data from two or more accelerometers 106a-d to determine the mean, median, or mode acceleration data. Further, in some cases, the heuristic controller 118 may cross-check the acceleration data via a majority vote algorithm, where for example three accelerometers 106a-d provide the same acceleration data, and one accelerometer 106a-d provides different acceleration data, the heuristic controller 118 may disregard the outlier and/or may flag the accelerometer 106a-d providing different data as faulty or malfunctioning as desired. In some cases, cross-checking acceleration data may include taking a simple average of the acceleration data provided by two or more accelerometers 106a-d, where the accelerometers 106a-d provide acceleration data within a relatively small variance (e.g., variance below a predetermined difference threshold).

Further, in some embodiments with two accelerometers 106a-d providing different acceleration data, the heuristic controller 118 may provide an error message and disregard the acceleration data and/or the touch input (e.g., where the touch input was provided in the high-priority region 138), or may simply choose one of the two accelerometers 106a-d and accept the respective acceleration data (e.g., where the touch input was provided in the low-priority region 136). The heuristic controller 118 may log or provide an error message indicating that one of the two accelerometers 106a-d is faulty, which error message may be provided to the user or to maintenance personnel as appropriate.

Referring now to FIG. 6, an exemplary embodiment of a method 150 of controlling a touch interface according to the inventive concepts disclosed herein is shown. The method 150 may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

A step 152 may include accessing, by a heuristic controller including at least one processor communicatively coupled with at least one accelerometer, acceleration data indicative of acceleration forces relative to a touch input surface.

A step 154 may include determining, by the heuristic controller, if at least one acceleration force of the acceleration forces relative to the touch input surface exceeds a predetermined threshold.

A step 156 may include in response to the at least one acceleration force exceeding the predetermined threshold, accessing touch input data indicative of a location of a touch input on the touch input surface and generating acceleration-corrected touch input data by applying a heuristic algorithm to the touch input data.

A step 158 may include transmitting, by the heuristic controller, at least one signal indicative of the acceleration corrected touch data to an avionics system.

In some embodiments, the touch input surface may include at least one first region and at least one second region, and the method 150 may further include determining, by the heuristic controller, if the location of the touch input is within the at least one first region, and in response to the location of the touch input being within the at least one first region and the at least one acceleration force exceeding the predetermined threshold, suppressing the touch input data. Further, in some embodiments, the method 150 may further include determining, by the heuristic controller, if the location of the touch input is within the at least one second region, and in response to the location of the touch input being within the at least one second region and the at least one acceleration force exceeding the predetermined threshold, interpreting the touch input data to generate at least one of: intended touch input data and at least one touch input error notification and transmitting at least one of: the intended touch input data to the avionics system and the at least one touch input error notification to the user.

In some embodiments, the accelerometer may be a first accelerometer configured to measure the acceleration forces relative to the touch input surface at a first position, and the method 150 may further include accessing acceleration data indicative of acceleration forces relative to the touch input surface at a second position from at least one second accelerometer, the second position separated from the first position by a known distance. The method may further include cross-checking the acceleration data relative to the touch input surface at the first position with the acceleration data relative to the touch input surface at the second position.

In some embodiments, the first and second position may be are aligned along a first axis of the touch input surface, and the method 150 may further include accessing acceleration data from at least one third accelerometer configured to measure the acceleration forces relative to the touch input surface at a third position, and acceleration data from at least one fourth accelerometer configured to measure acceleration forces relative to the touch input surface at a fourth position, the third and fourth positions separated from one another by a known distance and aligned along a second axis of the touch input surface orthogonal to the first axis. The method 150 may further include cross-checking the acceleration data relative to the touch input surface at the first position with the acceleration data relative to the touch input surface at the second position, and the acceleration data relative to the touch input surface at the third position with the acceleration data relative to the touch input surface at the fourth position.

In some embodiments, the method 150 may further include accessing, by the heuristic controller, touch interface data indicative of a current touch interface provided to a user via the touch interface surface, and generating the acceleration corrected touch input data at least partially based on the data indicative of a current touch interface provided to the user by the touch input interface.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A heuristic touch interface system, comprising:
a touchscreen display, the touchscreen display including a touch input surface, the touchscreen display provides touch input data indicative of a location of a touch input from a user on the touch input surface of the touchscreen display;
at least one accelerometer configured to determine acceleration forces relative to the touch input surface and to provide acceleration data indicative of acceleration forces relative to the touch input surface; and
a heuristic controller including at least one processor communicatively coupled with the at least one accelerometer and the touchscreen display, the at least one processor coupled with a non-transitory processor-readable medium storing processor executable code for causing the at least one processor to:
access the acceleration data to determine when at least one acceleration force of the acceleration forces relative to the touch input surface exceeds a predetermined threshold;
in response to the at least one acceleration force exceeding the predetermined threshold, access the touch input data;
provide an error message as a result of the acceleration forces relative to the touch input surface exceeds a predetermined threshold;
request a user provide a confirmation of the touch input data; and
then transmit at least one signal indicative of the touch input data to an avionics system.

2. The system of claim 1, wherein the accelerometer is a three-axis accelerometer configured to measure acceleration forces relative to the touch surface in three dimensions.

3. The system of claim 1, wherein the at least one accelerometer is at least one first accelerometer configured to measure the acceleration forces relative to the touch input surface at a first position, further comprising at least one second accelerometer configured to measure acceleration forces relative to the touch input surface at a second position and to provide acceleration data indicative of acceleration forces relative to the touch input surface at the second position.

4. The system of claim 3, wherein the non-transitory processor-readable medium further stores processor executable code for causing the at least one processor to cross-check the acceleration data relative to the touch input surface at the first position with the acceleration data relative to the touch input surface at the second position.

5. The system of claim 3, further comprising at least one third accelerometer configured to measure the acceleration forces relative to the touch input surface at a third position and at least one fourth accelerometer configured to measure acceleration forces relative to the touch input surface at a fourth position.

6. The system of claim 5, wherein the non-transitory processor-readable medium further stores processor executable code for causing the at least one processor to cross-check the acceleration data relative to the touch input surface at the first position with at least one of the acceleration data relative to the touch input surface at the second position, the acceleration data relative to the touch input surface at the third position, and the acceleration data relative to the touch input surface at the fourth position.

7. The system of claim 6, wherein the first and second positions are aligned with one another along a first axis of the touch input surface, and the third and fourth positions are aligned with one another along a second axis of the touch input surface, the second axis being orthogonal to the first axis.

8. The system of claim 1, wherein the touch input surface further comprises a touchscreen configured to provide at least one touch interface to the user.

9. The system of claim 1, wherein the predetermined threshold is based upon at least one of flight stage, flight leg or flight mission.

10. A method of controlling a touch interface, comprising:
accessing, by a heuristic controller including at least one processor communicatively coupled with at least one accelerometer, acceleration data indicative of acceleration forces relative to a touch input surface of a touchscreen display;
determining, by the heuristic controller, when at least one acceleration force of the acceleration forces relative to the touch input surface exceeds a predetermined threshold;
in response to the at least one acceleration force exceeding the predetermined threshold, accessing touch input data indicative of a location of a touch input on the touch input surface of the touchscreen display;
providing an error message as a result of the acceleration forces relative to the touch input surface exceeds a predetermined threshold;
requesting a user provide a confirmation of the touch input data; and
then transmitting, by the heuristic controller, at least one signal indicative of the touch input data to an avionics system.

11. The method of claim 10, wherein the at least one accelerometer is at least one first accelerometer configured to measure the acceleration forces relative to the touch input surface at a first position, further comprising accessing acceleration data indicative of acceleration forces relative to the touch input surface at a second position from at least one second accelerometer.

12. The method of claim 11, further comprising cross-checking the acceleration data relative to the touch input surface at the first position with the acceleration data relative to the touch input surface at the second position.

13. The method of claim 11, wherein the first and second position are aligned along a first axis of the touch input surface, further comprising accessing acceleration data from at least one third accelerometer configured to measure the acceleration forces relative to the touch input surface at a third position, and acceleration data from at least one fourth accelerometer configured to measure acceleration forces relative to the touch input surface at a fourth position.

14. The method of claim 13, further comprising cross-checking the acceleration data relative to the touch input surface at the first position with at least one of the acceleration data relative to the touch input surface at the second position, the acceleration data relative to the touch input surface at the third position, and the acceleration data relative to the touch input surface at the fourth position.

15. The method of claim 14, wherein the first and second positions are aligned with one another along a first axis of the touch input surface, and the third and fourth positions are aligned with one another along a second axis of the touch input surface, the second axis being orthogonal to the first axis.

16. The method of claim 10, wherein the predetermined threshold is based upon at least one of flight stage, flight leg or flight mission.

* * * * *